United States Patent
Yoon

(10) Patent No.: US 10,630,438 B2
(45) Date of Patent: Apr. 21, 2020

(54) METHOD AND APPARATUS FOR TRANSMITTING A REFERENCE SIGNAL IN WIRELESS COMMUNICATION SYSTEM

(71) Applicant: Apple Inc., Cupertino, CA (US)

(72) Inventor: Sung jun Yoon, Seoul (KR)

(73) Assignee: Apple Inc., Cupertino, CA (US)

( * ) Notice: Subject to any disclaimer, the term of this patent is extended or adjusted under 35 U.S.C. 154(b) by 340 days.

(21) Appl. No.: 14/351,819

(22) PCT Filed: Oct. 12, 2012

(86) PCT No.: PCT/KR2012/008286
§ 371 (c)(1),
(2) Date: Apr. 14, 2014

(87) PCT Pub. No.: WO2013/055136
PCT Pub. Date: Apr. 18, 2013

(65) Prior Publication Data
US 2014/0293943 A1    Oct. 2, 2014

(30) Foreign Application Priority Data
Oct. 14, 2011 (KR) .................. 10-2011-0105243

(51) Int. Cl.
*H04L 5/00* (2006.01)
*H04W 72/04* (2009.01)

(52) U.S. Cl.
CPC .......... *H04L 5/0048* (2013.01); *H04W 72/042* (2013.01)

(58) Field of Classification Search
CPC ........................... H04W 72/042; H04L 5/0048
(Continued)

(56) References Cited

U.S. PATENT DOCUMENTS

2006/0233285 A1*  10/2006  Hammes .............. H04L 25/0204
                                                                                    375/340
2008/0318608 A1    12/2008  Inoue et al.
(Continued)

FOREIGN PATENT DOCUMENTS

KR    10-2010-0021383    2/2010
WO      2009-143383    11/2009
(Continued)

OTHER PUBLICATIONS

International Search Report dated Mar. 26, 2013 in International Patent Application No. PCT/KR2012/008286.
(Continued)

*Primary Examiner* — Derrick W Ferris
*Assistant Examiner* — Abdeltif Ajid
(74) *Attorney, Agent, or Firm* — Kowert, Hood, Munyon, Rankin & Goetzel, P.C.

(57) ABSTRACT

The present invention is related to a method and an apparatus for transmitting a reference signal in a wireless communication system. The present specification comprises transmitting at least one of the user equipment (UE)-specific value which is the parameter used for generating the UE-specific reference signal sequence to the UE, selecting one value out of at least one of the UE-specific value and cell-specific value, calculating an initialization value of pseudo-noise (PN) sequence based on the value selected, generating a first reference signal sequence using the initialization value of PN sequence, mapping the first reference signal sequence to a resource element, and transmitting a reference signal to the UE using the resource element to which the first reference signal sequence is mapped.

16 Claims, 9 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2009/0238064 A1* | 9/2009 | Lee ....................... | H04L 5/0007 370/208 |
| 2010/0322178 A1* | 12/2010 | Li ......................... | H04L 5/0053 370/329 |
| 2011/0143655 A1 | 6/2011 | Ahn et al. | |
| 2012/0176884 A1* | 7/2012 | Zhang .................... | H04B 7/024 370/203 |
| 2013/0034064 A1* | 2/2013 | Nam ..................... | H04W 72/12 370/329 |
| 2013/0039284 A1* | 2/2013 | Marinier ................ | H04L 5/001 370/329 |
| 2015/0063234 A1* | 3/2015 | Park ....................... | H04B 7/024 370/329 |

FOREIGN PATENT DOCUMENTS

| | | | |
|---|---|---|---|
| WO | 2011-022417 | 2/2011 | |
| WO | 2011-088144 | 7/2011 | |
| WO | WO2012148475 A1 * | 11/2012 | .............. H04J 11/00 |

OTHER PUBLICATIONS

Office Action for Korean Patent Application No. 10-2011-0105243, dated Apr. 17, 2018, pp. 1-3.

Ericsson, "Downlink Reference Signals for Enhanced Multiplexing", 3GPP TSG-RAN WG1 #66bis, R1-113355, Zhuhai, China, Oct. 10-Oct. 14, 2011, pp. 1-2.

Catt, "DL Reference Signal Enhancement for CoMP Transmission", 3GPP TSG RAN WG1 Meeting #66bis, R1-112960, Zhuhai, China, Oct. 10-Oct. 14, 2011, pp. 1-3.

* cited by examiner

METHOD AND APPARATUS FOR TRANSMITTING A REFERENCE SIGNAL IN WIRELESS COMMUNICATION SYSTEM

CROSS REFERENCE TO RELATED APPLICATIONS

This application is the National Stage Entry of International Application PCT/KR2012/008286, filed on Oct. 12, 2012, and claims priority from and the benefit of Korean Patent Application No. 10-2011-0105243, filed on Oct. 14, 2011, both of which are incorporated herein by reference for all purposes as if fully set forth herein.

BACKGROUND

Field

The present invention relates to a wireless communication, and more particularly, to a method and an apparatus for transmitting a reference signal in a wireless communication system.

Discussion of the Background

The multi-cell (or point) cooperation has been introduced in order to improve the performance of the wireless communication system and the communication capacity. The multi-cell (or point) cooperation is also referred to the cooperative multiple point (CoMP).

As the implementation of the CoMP, there are the beam evasion technique in which the neighboring cells cooperate and mitigate the interference of the user located on the border of the cell (or point) and the joint transmission technique in which the neighboring cells cooperate and transmit the identical data.

In the next generation wireless communication system such as IEEE (Institute of Electrical and Electronics Engineers) 802.16m or 3GPP (3rd Generation Partnership Project) LTE (long term evolution)-Advanced, what to improve the performance of the users which are located in the border of cell and interfered seriously from neighboring cells one of the major demands, and the CoMP may be considered to solve it. Various scenarios can be deployed for the CoMP.

In the various environment of CoMP, in case that cell IDs of the RRHs forming the cooperative set and the macro cell is identical to each other, the interference may occur since the reference signal sequences based on the each cell IDs are the same. Accordingly, the method to solve the interference problem is required.

SUMMARY

An object of the present invention is to solve the problem of described above is to provide a method and an apparatus for transmitting a reference signal in a wireless communication system.

Another object of the present invention is to provide a method and an apparatus for generating a reference signal sequence to have the quasi (pseudo)-orthogonality for each user equipment (UE).

Another object of the present invention is to provide a method and an apparatus for generating a UE specific reference signal sequence in the CoMP system.

Another object of the present invention is to provide a method and an apparatus for generating a reference signal sequence using the UE specific value in the CoMP system.

Another object of the present invention is to provide a method and an apparatus for transmitting the UE specific value in the CoMP system.

According to an aspect of the present invention, a method for transmitting a reference signal by a transmission and reception point in a wireless communication system is provided. The method comprises transmitting at least one of the user equipment (UE)-specific value which is the parameter used for generating the UE-specific reference signal sequence to the UE, selecting one scrambling code value out of at least one of the UE-specific value and cell-specific value, calculating an initialization value of pseudo-noise (PN) sequence based on the value selected, generating a reference signal sequence using the initialization value of PN sequence, mapping the reference signal sequence to a resource element, and transmitting a reference signal to the UE using the resource element to which the reference signal sequence is mapped.

According to another aspect of the present invention, a method for receiving a reference signal by a user equipment (UE) in a wireless communication system is provided. The method comprises receiving at least one of the UE-specific value which is the parameter used for generating the UE-specific reference signal sequence of the UE from a transmission and reception point, calculating an scrambling code initialization value of pseudo-noise (PN) sequence based on one value out of at least one of the UE-specific value and cell-specific value, calculating a reference signal sequence using the initialization value of PN sequence, receiving the reference signal sequence from the transmission and reception point, and estimating a downlink channel by comparing the reference signal sequence obtained from the reference signal received with the reference signal sequence calculated.

According to still another aspect of the present invention, a transmission and reception point transmitting a reference signal in a wireless communication system is provided. The transmission and reception point comprises a transmission and reception point message processing unit which indicates a UE-specific value or a cell-specific value which is a parameter used for generating the UE-specific reference signal sequence, a transmission and reception point RF unit which transmits the UE-specific value to the UE, and a RS transmission control unit which determines a scrambling code identifier to the UE-specific value or the cell-specific value, calculates an initialization value of a PN sequence using the scrambling code identifier determined, generates the reference signal sequence based on the initialization value of the PN sequence.

The transmission and reception point RF unit performs mapping the reference signal sequence generated to a resource element, and may transmit the reference signal to the UE through the resource element mapped.

According to still another aspect of the present invention, a user equipment (UE) receiving a reference signal in a wireless communication system is provided. The UE comprises a UE RF unit which receives at least one of the UE-specific value which is the parameter used for generating a UE-specific reference signal sequence from a transmission and reception point, and a channel estimating unit which determines a scrambling code identifier to the UE-specific value or the cell-specific value through the downlink control information, calculates an initialization value of a PN sequence using the scrambling code identifier determined, induces the reference signal sequence based on the initialization value of the PN sequence.

The channel estimating unit identifies the reference signal received from the transmission and reception point using the reference signal sequence induced, and may perform a downlink channel estimation based on the reference signal identified.

According to the present invention, In an environment of CoMP where a cell ID of the RRHs forming the cooperative set with a macro cell is identical to a cell ID of the macro cell, the interference problem which may occur since reference signal sequences based on each of the cell IDs are the same can be solved.

DETAILED DESCRIPTION OF THE ILLUSTRATED EMBODIMENTS

Figure 1:
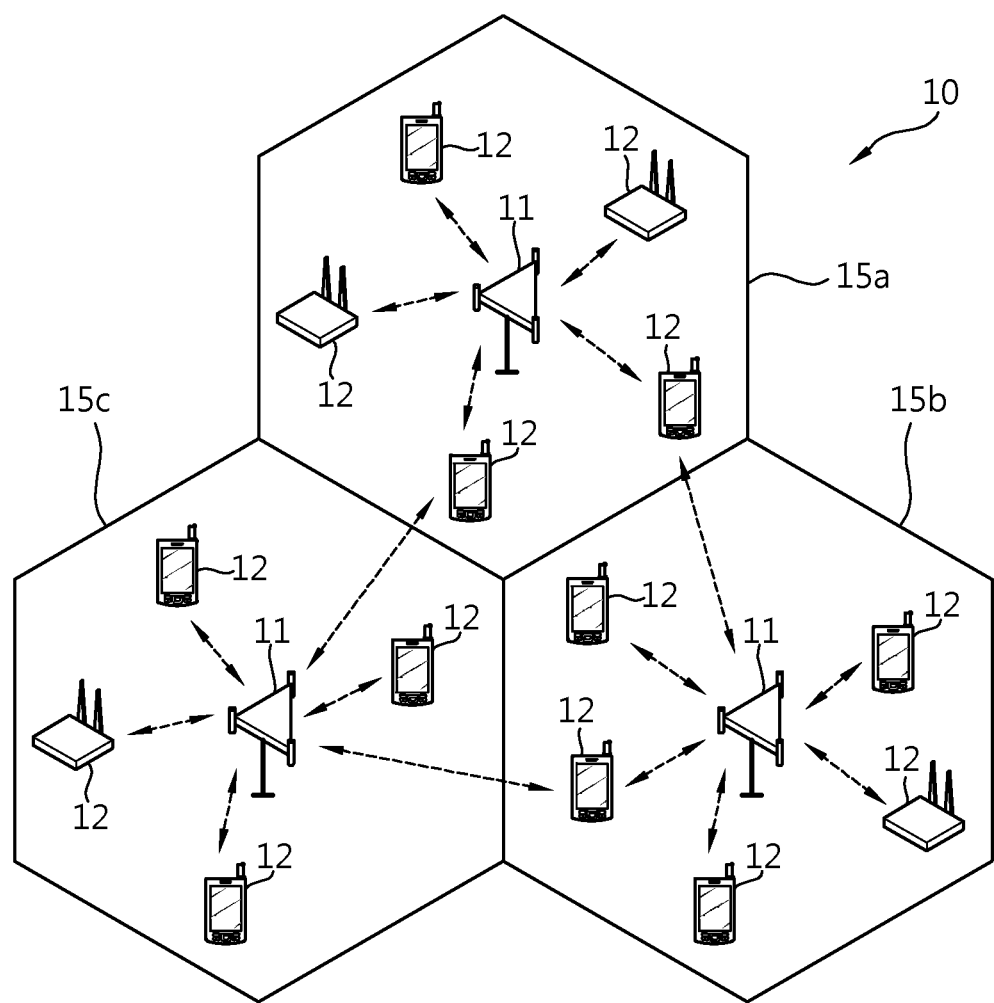
FIG. 1 is a block diagram illustrating a wireless communication system to which the present invention is applied.

Hereinafter, in the present specification, a part of embodiments will be described in detail by referring to exemplary drawings. In attaching the reference numeral on elements of each drawing, it should be understood that the same elements will be denoted by the same reference numeral although the elements are depicted in different drawings. Also, in describing embodiments of the present invention, in case the detailed description of the relevant known art or function may confuse the subject matter, the description will be omitted.

The present specification describes the communication network as a subject, the operations performed in the communication network may be executed during the process of controlling the network and transmitting data in the system (for example, a base station) that controls the corresponding communication network, or may be executed by a user equipment which is linked to the corresponding network.

According to embodiments of the present invention, the meaning of 'transmitting a control channel' may be interpreted that the control information is transmitted through a specific channel. Here, the control channel may be either one of the Physical Downlink Control Channel (PDCCH) or the Physical Uplink Control Channel (PUCCH).

FIG. 1 is a block diagram illustrating a wireless communication system to which the present invention is applied.

Referring to FIG. 1, the wireless communication system 10 is widely disposed in order to provide various communication services such as voice, packet data, and so on. The wireless communication system 10 includes at least one Base Station (BS) 11. Each BS 11 provides communication service for particular geographical region or frequency region, and may also be referred to a site. The site may be divided into a plurality of areas 15a, 15b and 15c which are also called sectors, and the sectors may have cell IDs which are different from each other.

A user equipment (UE) 12 may be fixed or mobile and may be called other names such as mobile station (MS), mobile terminal (MT), user terminal (UT), subscriber station (SS), wireless device, personal digital assistant (PDA), wireless modem, handheld device, and the like. The BS 11 generally refers to a station that communicates with the UE 12 and may be called other names such as evolved-NodeB (eNB), Base Transceiver System (BTS), Access Point (AP), Femto eNodeB, Home eNodeB (HeNodeB), relay, remote radio head (RRH), and so on. The cell 15a, 15b and 15c should be interpreted as a comprehensive meaning that represents a partial area covered by the BS 11, which includes various coverage areas such as a mega cell, a macro cell, a micro cell, a pico cell, a femto cell, and the like.

Hereinafter, downlink refers to communication or communication path from the BS 11 to the UE 12 and uplink refers to communication or communication path from the UE 12 to the BS 11. In downlink, a transmitter may be a part of the BS 11 and a receiver may be part of the UE 12. In uplink, a transmitter may be a part of the UE 12 and a receiver may be a part of the BS 11. There is no limitation in the multi access method which is applied to the wireless communication system. Various multi access methods may be used such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, OFDM-CDMA. These modulation methods increase the capacity of the communication system by demodulating the signals received from the multiple users of the communication system. A Time Division Duplex (TDD) scheme transmitted using different time and a Frequency Division Duplex (FDD) scheme transmitted using different frequency are used for the uplink transmission and the downlink transmission.

The wireless communication system 10 may be a Coordinated Multi Point (CoMP) system. The CoMP system refers to the communication system that supports CoMP or to which the CoMP is applied. The CoMP is a technology that regulates or combines the signals transmitted or received by multi transmission/reception (Tx/Rx) points. The CoMP may increase the data throughput and provide high quality.

A transmission and reception point may be defined as one of a Component Carrier, a cell, a base station (macro cell, Pico eNodeB), a Femto eNodeB, or a remote radio head (RRH). Or, the transmission and reception point may be defined as a set of antenna ports. And the transmission and reception point may transmit the information for the set of antenna ports to the UE through radio resource control (RRC) signaling. Accordingly, multiple Transmission Points (TPs) in a cell may be defined as the set of the antenna ports. Each base station or cells may configure multiple transmission and reception points. For example, the multiple transmission and reception points may be the macro cell forming a homogeneous network. Also, the transmission and reception points may be the RRHs which have the macro cell and high transmission power. Also, the multiple transmission and reception points may be the RRHs which have the macro cell and low transmission power in the macro cell area.

The CoMP system may selectively use the CoMP. That is, the CoMP system may or may not apply the CoMP to the communication operation. The mode that the CoMP system performs communication using the CoMP is referred to the CoMP mode, and otherwise, the other mode is referred to the normal mode or the non-CoMP mode.

The UE 12 may be a CoMP UE. The CoMP UE is a constituent element of the CoMP system, and performs communication with the CoMP Cooperating Set. The CoMP UE may be operated in the CoMP mode or in the normal mode same as the CoMP system. And the CoMP cooperating set may be the set of the transmission and reception points which directly/indirectly participate in the data transmission in a certain time-frequency resource with respect to the CoMP UE.

To participate directly in the transmission or reception of data may mean that the transmission and reception points actually transmit data to the CoMP UE in the corresponding time-frequency resource, or receive data from the CoMP UE. To participate indirectly in the transmission or reception of data may means that the transmission and reception points actually transmit data to the CoMP UE in the corresponding time-frequency resource, or do not receive data from the CoMP UE, but contribute in the decision of user scheduling/beamforming.

The CoMP UE may receive signal from the CoMP cooperating set at the same time, and also transmit signal to the CoMP cooperating set at the same time. In this time, the CoMP system may minimize the interference among the CoMP cooperating sets considering the channel environment of each cell which includes the CoMP cooperating set.

When operating the CoMP system, various scenarios may be deployed. The first CoMP scenario is about a CoMP which is comprised of the homogeneous network among the multiple cells in a base station, which may be referred to the intra-site CoMP. The second CoMP scenario is about a CoMP which is comprised of the homogeneous network with respect to one macro cell and more than one high-power RRH. The third CoMP scenario and the fourth CoMP scenario are about a CoMP which comprised of the heterogeneous network with respect to one macro cell and more than one low-power RRH in a region of the macro cell. In this case, the case that the physical cell ID of the RRHs is not the same as that of the macro cell corresponds to the third CoMP scenario, and the case that the physical cell ID of the RRHs is the same as that of the macro cell corresponds to the fourth CoMP scenario.

In the CoMP category, Joint Processing (JP, hereinafter, referred to 'JP') and Coordinated Scheduling/Beamforming (CS/CB, hereinafter, referred to 'CS/CB') exist, and it is possible to combine JP and CS/CB.

In case of JP, data regarding the UE is available at least one transmission and reception point of the CoMP cooperating set in a certain time-frequency resource. JP may include Joint Transmission (JT, hereinafter, referred to 'JT') and Dynamic Point Selection (DPS, hereinafter, referred to 'DPS').

JT is referred that data transmission is performed to one UE or multiple UEs from the multi-points which are included in the CoMP cooperating set at the same time in time-frequency resource. In case of JT, multi cells (multi-points) which are transmitting data for one UE may perform data transmission using the same time-frequency resource.

In case of DPS, data transmission may be performed in time-frequency resource from a point of transmission and reception in the CoMP cooperating set. The transmission and reception point may be changed for each subframe considering interference. The data transmitted may be used in the multiple points of transmission and reception at the same time. DPS may include Dynamic Cell Selection (DCS).

In case of CS, data may be transmitted from a point of transmission and reception in the CoMP cooperating set through a time-frequency resource, and the uplink and downlink scheduling for the UE may be determined by coordination among the points of transmission and reception in the CoMP cooperating set.

In case of CB, the uplink and downlink scheduling for the UE may also be determined by coordination among the points of transmission and reception in the corresponding CoMP cooperating set. The interference that occurs among the UEs of the neighboring cell may be avoided by the Coordinated Beamforming.

The CS/CB may include Semi-Static Point Selection (SSPS) that is able to select (change) the point of transmission and reception with being semi-static.

As described above, the scheme of operating with JP and CS/CB being mixed can be implemented by the CoMP. For example, a few points of transmission and reception in the CoMP cooperating set may transmit data to the target UE according to JP, other points of transmission and reception in the CoMP cooperating set may perform CS/CB.

The transmission and reception point to which the present invention is applied may include the BS, the cell or the RRH. That is, the BS or the RRH may be the transmission and reception point. Meanwhile, multiple BS may be multiple transmission and reception points, or multiple RRHs may be multiple points of transmission and reception. The operation of all BSs or RRHs described in the present invention may be applied to a different form of the transmission and reception point.

The layers of the radio interface protocol between the UE and the BS may be divided into the first layer (L1), the second layer (L2) and the third layer (L3) based on the lower three layers of the Open System Interconnection (OSI) model which is well known in the communication system. Among the layers, the physical layer which is included in the first layer provides the information transfer service using physical channel.

There exist a few physical channels used in the physical layer. A physical downlink control channel (PDCCH) may carry the resource allocation and transmission format of the downlink shared channel (DL-SCH), the resource allocation information of the Uplink Shared Channel (UL-SCH), the resource allocation of the higher layer control massage such as the random access response transmitted through a physical downlink shared channel (PDSCH), the set of the transmission power control (TPC) command of individual UEs in a certain UE group, and so on. Multiple PDCCHs may be transmitted with being mapping in the control region of the subframe, and the UE may monitor the multiple PDCCHs.

The control information of the physical layer which is mapped to the PDCCH is referred to downlink control information (DCI). That is, the DCI is transmitted through the PDCCH. The DCI may include the uplink or downlink resource allocation field, the uplink transmission power control command field, the control field for paging, the control field for indicating the random access (RA) response, and the like.

The usage of the DCI may be different according to the format, and the field defined in the DCI may be different. Table 1 represents the DCI according to various formats.

TABLE 1

| DCI format | Description |
| --- | --- |
| 0 | Used for scheduling of the PUSCH(uplink grant) |
| 1 | Used for scheduling of one PDSCH codeword in one cell |
| 1A | Used for compact scheduling of one PDSCH codeword in one cell and the random access process initialized by the PDCCH command |
| 1B | Used for compact scheduling of one PDSCH codeword in one cell using preceding information |
| 1C | Used for compact scheduling of one PDSCH codeword and the notice of MCCH change |
| 1D | Used for compact scheduling of one PDSCH codeword in one cell including the preceding and the power offset information |
| 2 | Used for PDSCH scheduling for the UE comprised of spatial multiplexing mode |
| 2A | PDSCH scheduling for the UE comprised of the CDD mode of large delay |
| 2B | Used for transmission mode 8 (double layer transmission) |
| 2C | Used for transmission mode 9 (multi layer transmission) |
| 3 | Used for transmission of the TPC command for the PUCCH and the PUSCH including power regulation of 2 bits |
| 3A | Used for transmission of the TPC command for the PUCCH and the PUSCH including power regulation of a single bit |
| 4 | Used for scheduling of the PUSCH (uplink grant), especially, used for PUSCH scheduling for the UE comprised of spatial multiplexing mode |

Referring to Table 1, DCI format 0 is used for the uplink scheduling information, and format 1 for scheduling of one PDSCH codeword, format 1A for compact scheduling of one PDSCH codeword, format 1C for very compact scheduling of DL-SCH, format 2 for PDSCH scheduling in closed-loop spatial multiplexing mode, format 2A for PDSCH scheduling in open-loop spatial multiplexing mode, format 3 and 3A for transmission of the transmission power control (TPC) command for the uplink channel are existed.

Each field of the DCI is sequentially mapped to the information bit of the number by n from $a_0$ to $a_{n-1}$. For example, if the DCI is mapped to the information bit of total length of 44 bits, each DCI field is sequentially mapped from $a_0$ to $a_{43}$. DCI format 0, 1A, 3 and 3A may have the same payload size. DCI format 0 may be called unlink grant.

Figure 2:
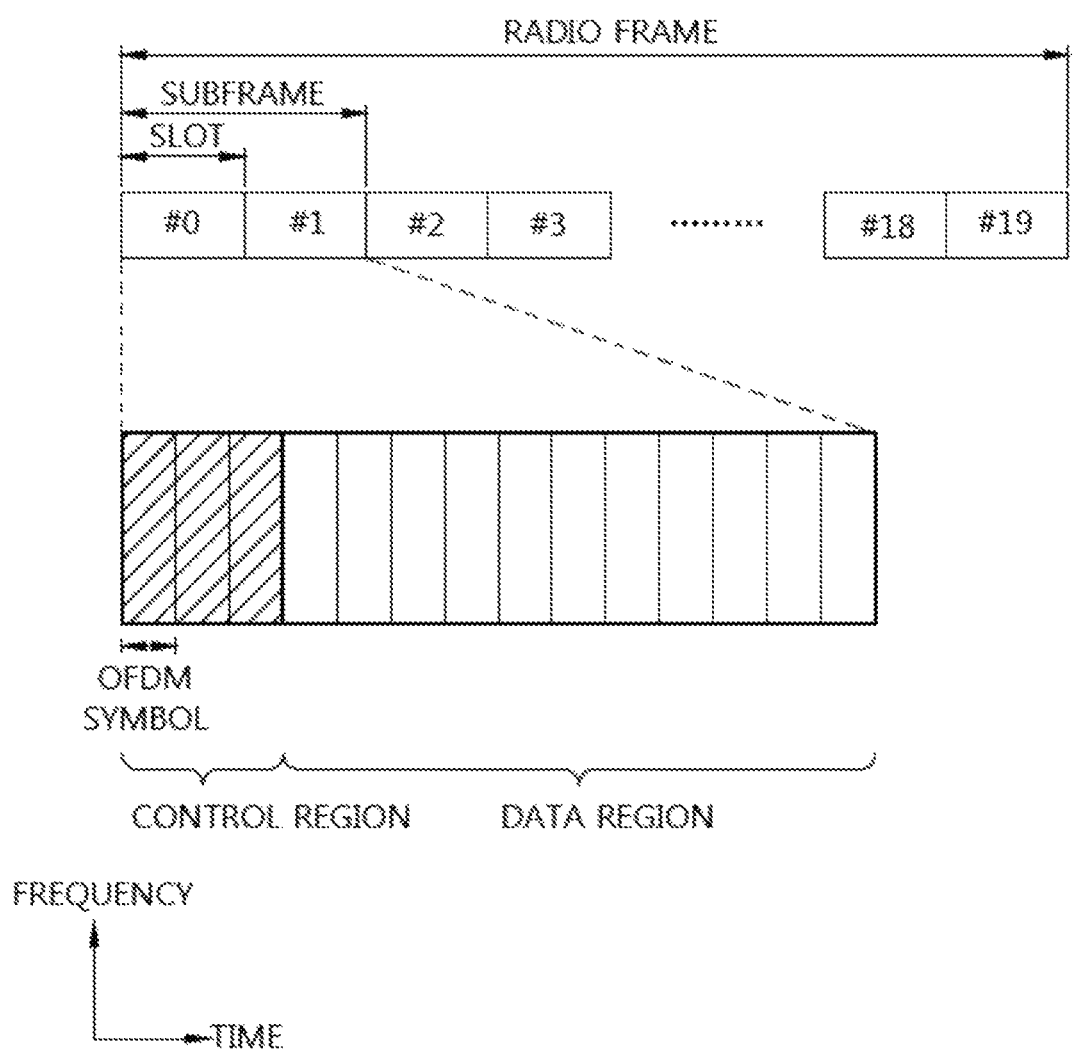
FIG. 2 and FIG. 3 are schematic views of the structure of a radio frame to which the present invention is applied.
Figure 3:
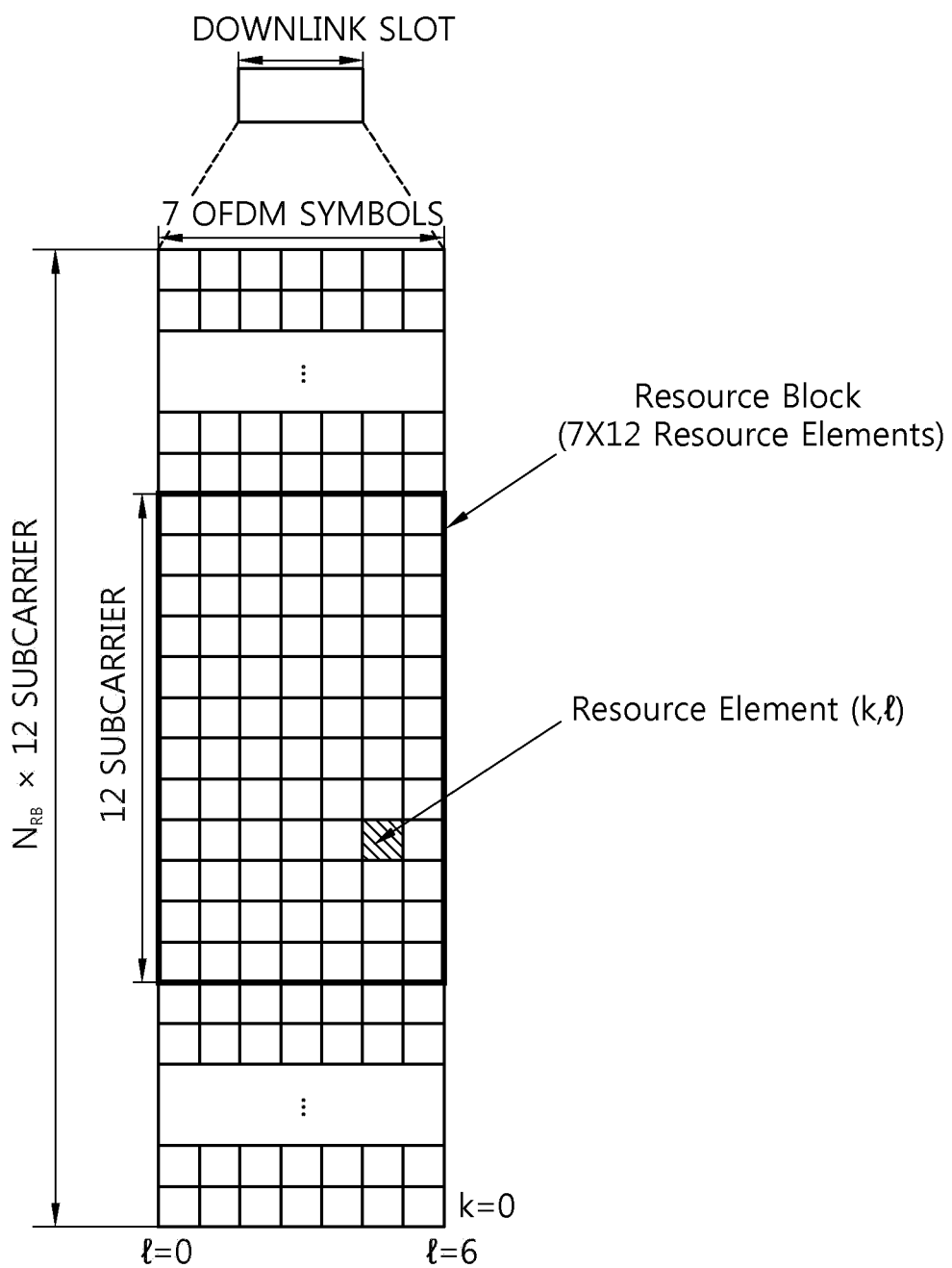

FIG. 2 and FIG. 3 are schematic views of the structure of a radio frame to which the present invention is applied.

Referring to FIG. 2 and FIG. 3, a downlink radio frame may include 10 subframes. One subframe includes two slots. The time (length) taken for transmitting one subframe is called a Transmission Time Interval (TTI). For example, the length of one subframe may be 1 ms, and the length of one slot may be 0.5 ms.

One slot may include a plurality of symbols in the time domain. For example, in case of the wireless system that uses a Orthogonal Frequency Division Multiple Access (OFDMA) in downlink, the symbol above may be a Orthogonal Frequency Division Multiplexing (OFDM) symbol. Meanwhile, the expression of the symbol period in the time domain is not limited by the multi-access scheme or by terminology. For example, the plurality of symbols in the time domain may be a Single Carrier-Frequency Division Multiple Access (SC-FDMA) symbol, or a symbol period and so on as well as the OFDM symbol.

The number of the OFDM symbol which is included in a slot may be changed according to the length of a Cyclic Prefix (CP). For example, in case of a normal CP, 1 slot includes 7 OFDM symbols, and in case of an extended CP, 1 slot includes 6 OFDM symbols.

A Resource Block (RB) is a unit of resource allocation, includes the time-frequency resource corresponding to one slot on the axis of time and to 180 kHz on the axis of frequency. For example, if one slot includes 7 symbols on the axis of time and 180 kHz include 12 subcarriers on the axis of frequency, one resource block may have 7×12 resource elements (REs).

The RE represents the smallest time-frequency unit to which the modulation symbol of the data channel or the modulation symbol of the control channel is mapped.

In a wireless communication system, it is necessary to estimate an uplink channel or a downlink channel for the purpose of the transmission and reception of data, the acquisition of system synchronization, and the feedback of channel information. A process of restoring a transmission signal by compensating for the distortion of the signal resulting from a sudden change in the environment is referred to channel estimation. It is also necessary to measure the channel state for a cell to which the UE belongs or for other cells. To estimate channel or to measure the channel state, a Reference Signal (RS) which is known to both of the UE and the transmission and reception point reciprocally may be used.

Since the UE knows the information of the reference signal, the UE may accurately estimate data transmitted from the transmission and reception point by estimating a channel based on the reference signal received and compensating the channel value. Assuming that the reference signal transmitted from the transmission and reception point is p, the channel information which the reference signal goes through during transmission is h, the thermal noise occurred in the UE is n, and the signal received by the UE is y, it may be represented by y=h·p+n. Here, since the UE already knows the reference signal p, it can estimate channel information ĥ shown in Equation 1 in case of using the Least Square (LS) method.

$$\hat{h} = \frac{y}{p} = h + \frac{n}{p} = h + \hat{n}$$ [Equation 1]

Here, since the channel estimation value ĥ estimated by using the reference signal p is dependent upon the value n̂, it is necessary to converge the value n̂ on 0 to accurately estimate the value h.

Generally, the reference signal is transmitted by generating signal from the sequence of the reference signal. More than one of several sequences with good correlation characteristics may be used for the sequence of the reference signal. For example, a pseudo-noise (PN) sequence such as a Zadoff-Chu (ZC) sequence, a Constant Amplitude Zero Auto-Correlation (CAZAC) sequence, a m-sequence, a Gold sequence, a Kasami sequence, and the like may be used for the sequence of the reference signal. In addition to this, various sequences with good correlation characteristics may be used according to the system environment. Also, in order to adjust the length of the reference signal sequence, cyclic extension or truncation may be done to use, and may be mapped to the resource element (RE) with being modulated as various forms such as Binary Phase Shift Keying (BPSK) or Quadrature Phase Shift Keying (QPSK), and so on.

The downlink reference signal includes a Cell-specific RS (CRS), a Multimedia Broadcast and multicast Single Frequency Network (MBSFN) RS, a UE-specific RS, a Positioning RS (PRS), a Channel State Information (CSI) RS (CSI-RS), and so on.

The CRS is the reference signal transmitted to all UEs in a cell, and used for channel estimation. The CRS may be transmitted in all downlink subframe in the cell supporting the PDSCH transmission.

The UE-specific RS is the reference signal received by a specific UE or a specific UE group in a cell, and may be called a Demodulation RS (DM-RS) since it is mainly used for data demodulation of the specific UE or the specific UE group.

The MBSFN RS is the reference signal for providing a Multimedia Broadcast Multicast Service, and the PRS may be used as the reference signal for measuring the position of the UE.

The CSI-RS may be used for estimating the channel state information. The CSI-RS is disposed in frequency domain or time domain. If it is necessary, a Channel Quality Indicator (CQI), a Precoding Matrix Indicator ((PMI) and a Rank Indicator (RI) may be reported from the UE as the channel state information through channel state estimation using the CSI-RS. The CSI-RS may be transmitted on more than one antenna port.

Multiple cells or the transmission and reception points may transmit the reference signal to the UE even in the CoMP system.

As an example, the reference signal sequence may be determined in cell-specific manner in the CoMP system. In particular, in the fourth scenario as an environment of the CoMP where the cell ID of the transmission and reception point (for example, the RRHs) forming the cooperating set with a specific transmission and reception point (for example, the macro cell) is identical with the cell ID of the specific transmission and reception point, the identical reference signal sequence is used for generating reference signal in one macro cell. This means that all of the transmission and reception points (for example, the RRH) included in the same cooperating set with the macro cell also transmit the reference signal by using the identical reference signal sequence. This will be described in FIG. 4.

Figure 4:
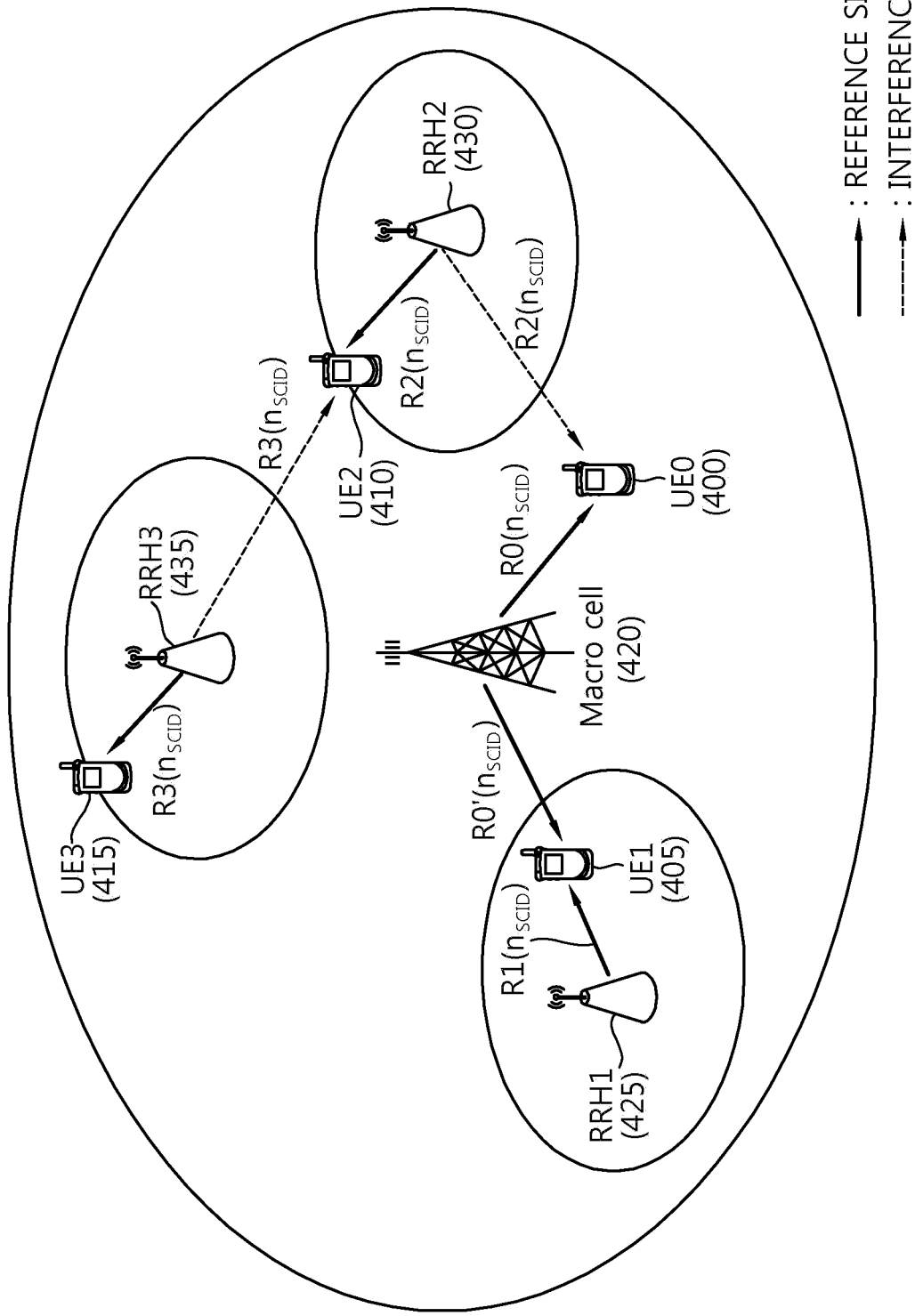
FIG. 4 is a schematic view for describing the method of transmitting reference signal in the CoMP system according to an embodiment of the present invention.

FIG. 4 is a schematic view for describing the method of transmitting reference signal in the CoMP system according to an embodiment of the present invention.

Referring to FIG. 4, the serving cells for UE0 400, UE1 405, UE2 410 and UE3 415 are the macro cell 420, RRH1 425, RRH2 430 and RRH3 435, respectively. Also, the bandwidth allocated for each UE in the UE0 400, the UE1 405, the UE2 410 and the UE3 415 is overlapped with a part or the whole bandwidth allocated for the other UEs on the frequency domain.

If cell IDs of the macro cell 420 and each of the RRHs 425, 430 and 435 are identical, the macro cell 420 and each of the RRHs 425, 430 and 435 transmits the reference signal R0, R0', R1, R2 and R3 to each UE based on the identical reference signal sequence generated on the basis of Equation 2 and Equation 3. The reference signal sequence r (m) is defined as Equation 2.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

$$m = \begin{cases} 0, 1, \ldots, 12N_{RB}^{max,DL} - 1 & \text{for normal cyclic prefix} \\ 0, 1, \ldots, 16N_{RB}^{max,DL} - 1 & \text{for extended cyclic prefix} \end{cases}$$

Herein, $N_{RB}^{max,DL}$ represents the maximum number of the downlink resource block. The reference signal sequence r (m) is generated from PN sequence c(2m) and c(2m+1) on each of the real-number axis and the imaginary-number axis on the complex plane. The PN sequence c(i) in Equation 2 is the pseudo random sequence defined by the gold sequence, and initialized when every subframe begins as Equation 3.

$$c_{init} = (\lfloor n_s/2 \rfloor + 1) \cdot (2N_{ID}^{cell} + 1) \cdot 2^{16} + n_{SCID} \quad \text{[Equation 3]}$$

Referring to Equation 3, $n_s$ has the value of 0 to 19 as the slot number in the radio frame, and $N_{ID}^{cell}$ represents the physical layer cell ID (PCID). The scrambling code identifier $n_{SCID}$ has either one value of 0 or 1. Accordingly, the initialization value $c_{init}$ of the PN sequence may have different values according to the slot number $n_s$, the physical cell ID $N_{ID}^{cell}$ and the scrambling code identifier $n_{SCID}$.

In case that $n_{SCID}$ is identical, the macro cell 420 and each of the RRHs 425, 430 and 435 generate the sequence of the same reference signal in specific time (specific slot), maps the sequence to resource element and may generate and transmit each of the reference signal R0, R0', R1, R2 and R3 to each UE. For example, the macro cell 420 may transmit the reference signals R0 and R0' to the UE0 400 and the UE1 405 on the same time-frequency resource. In this time, the Multi User-MIMO (Multi User-MIMO) technique may be used.

To distinguish two reference signals R0 and R0' transmitted on the same time-frequency resource at the same time, the orthogonal sequence same as different orthogonal cover code (OCC) one another for the identical reference signal sequence may be used. Also, the RRH1 425 transmits the reference signal R1 to the UE1 405, the CoMP UE. Accordingly, JT may let the UE1 405 receive the reference signals R0' and R1 from the macro cell 420 as well as from the RRH1 425 on the same time-frequency resource at the same time. In this time, the identical reference signal sequence is required to be used for the reference signals R0' and R1. That is, it is required for the reference signals R0, R0' and R1 to use the identical reference signal sequence, and it is available to use the method for generating the reference signal sequence such as Equation 2 in the condition that the cell IDs of the macro cell 420 and the RRH1 425 are identical.

Meanwhile, the RRH2 430 transmits R2 to the UE2 410, and the RRH3 435 transmits R3 to the UE3 415. In the environment of the CoMP, the example of transmitting signal to each of the UE2 410 and the UE3 415 from the RRH2 430 and the RRH3 435 may be performed by using a dynamic point selection (DPS) or a coordinated scheduling/beamforming (CS/CB), but not limited thereto. Although the RRH2 430 transmits the reference signal R2 (shown by the solid line in drawing) to the UE2 410, which may corresponds to receiving the interference signal R2 (shown by the dotted line in drawing) by using the reference signal sequence which is identical to R0 from the view point of UE0 400. Likewise, although the RRH3 435 transmits the reference signal R3 (shown by the solid line in drawing) to the UE3 415, which may corresponds to receiving the interference signal R3 (shown by the dotted line in drawing) by using the reference signal sequence which is identical to R2 from the view point of UE2 410.

That is, in the fourth scenario of the CoMP, all of the reference signals R0, R0', R1, R2 and R3 may have identical reference signal sequence by the identical $n_{SCID}$ in the Equations 2 and 3, which may result in the interference problem.

As another example, the reference signal sequence is determined in UE-specific manner. Since the reference signal sequence is determined distinctly for every UE, the transmission and reception points (for example, RRH) belonged to the same cooperating set with the macro cell transmit the reference signal using different reference signal sequences. This will be described in FIG. 5.

Figure 5:
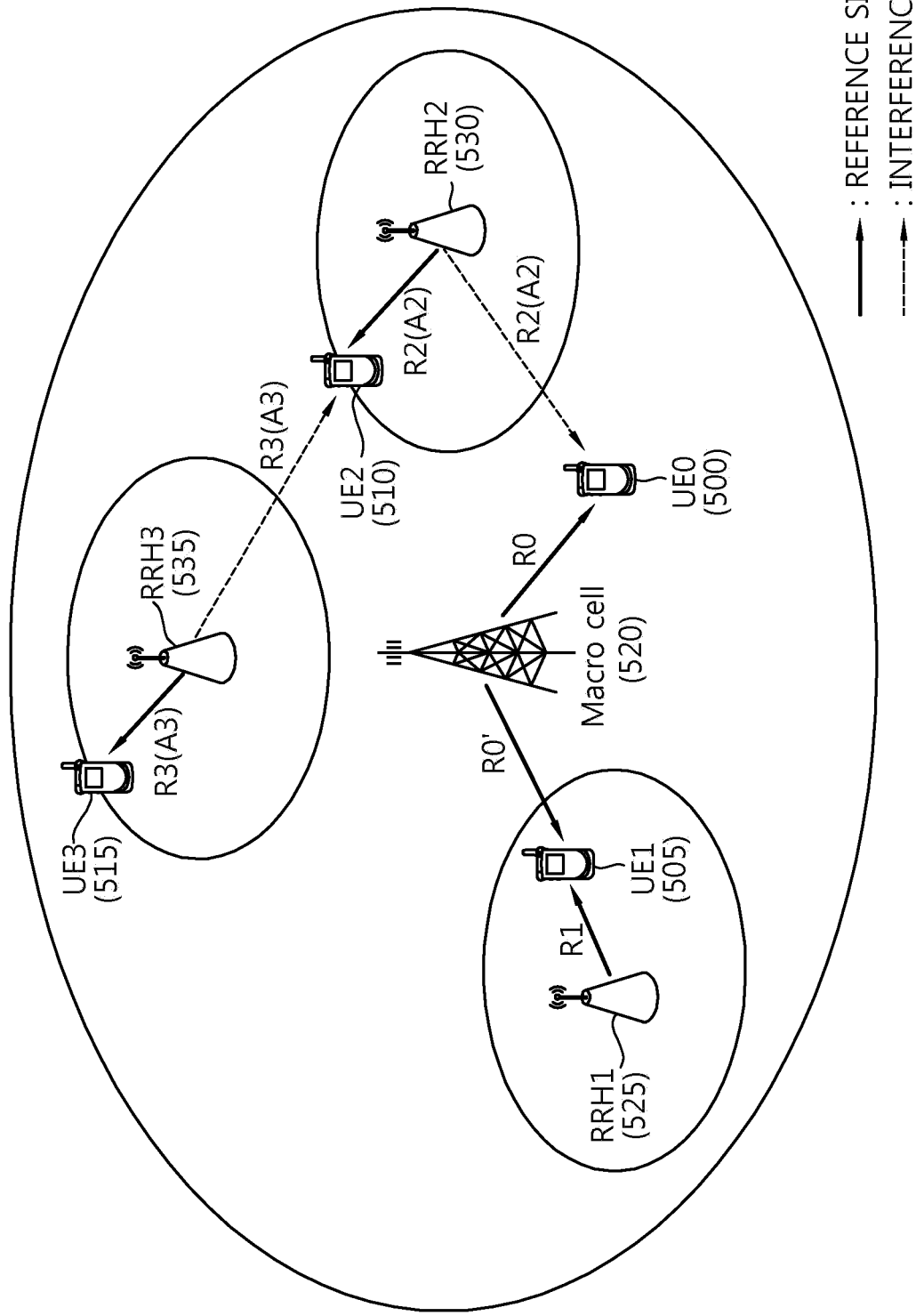
FIG. 5 is a schematic view for describing the method of transmitting reference signal in the CoMP system according to another embodiment of the present invention.

FIG. 5 is a schematic view for describing the method of transmitting reference signal in the CoMP system according to another embodiment of the present invention.

Referring to FIG. 5, the serving cells for UE0 500, UE1 505, UE2 510 and UE3 515 are the macro cell 520, RRH1 525, RRH2 530 and RRH3 535, respectively. Also, the bandwidth allocated for each UE in the UE0 500, the UE1 505, the UE2 510 and the UE3 515 is overlapped with a part or the whole bandwidth allocated for the other UEs on the frequency domain. Here, it is assumed that the cell IDs of the RRHs 525, 530 and 535 forming the cooperating set with the macro cell 520 are identical to the cell ID of the macro cell 520.

The transmission and reception points that communicates (or transmits signal) with a specific UE transmits the reference signal based on the identical reference signal sequence (for example, when the identical signal is transmitted to a specific UE by JT), but the transmission and reception points that communicate with other UE, not with the specific UE may generate the reference signal which is different from the reference signal which is transmitted to the specific UE and transmit it.

For example, to exclude the interference signal R2 (shown by dotted line) given to the UE0 500, the RRH2 530 may generate the initialization value $c_{init}$ of the reference signal sequence of R2 by using the UE-specific value A2 of the UE2 510 that may replace $n_{SCID}$, not by using the cell-specific value through $n_{SCID}$ that has the value of only 0 or 1. That is, the RRH2 530 may generate the reference signal for the UE2 510 using the reference signal sequence initialization value which is different from the initialization value of the reference signal sequence of the macro cell 520 for the UE0 500, and accordingly transmit R2 to the UE2 510. Likewise, to exclude the interference signal R3 given to the UE2 510, the RRH3 535 may generate the initialization value of the reference signal sequence of R3 by using the UE-specific value A3 of the UE3 515, not by using the cell-specific value through $n_{SCID}$ that has the value of only 0 or 1. That is, the RRH3 535 may generate the reference signal for the UE3 515 using the reference signal sequence initialization value which is different from the initialization value of the reference signal sequence of the RRH2 530 for the UE2 510, and accordingly transmit R3 to the UE3 515.

The UE2 510 may receive R2 (shown by solid line) and R3 (shown by dotted line). However, the reference signal sequence of R2 may be generated by A2, and the reference signal sequence of R3 may be generated by A3. That is, R2 and R3 are the reference signals transmitted through the reference signal sequence which is pseudo orthogonal to each other. Accordingly, the UE2 510 may distinguish R2 and R3, and may minimize the influence from R3 which is the interference signal for R2 which is actually to be received.

When each RRH 525, 530 and 535 belonged to the cooperating set with the macro cell 520 transmits the reference signals to the UEs, in order to give pseudo orthogonality among each of the reference signals, the reference signal R2 transmitted to the UE2 510 from the RRH2 530 and the reference signal R3 transmitted to the UE3 515 from the RRH3 535 may be transmitted by different reference signal sequences. However, R0, R0' and R1 may be generated based on the identical reference signal sequence, and the reference signal sequence of R0, R0' and R1 may be pseudo orthogonal to the reference signal sequence of R2, and may be also pseudo orthogonal to the reference signal sequence of R3. To summarize this, the identical reference signal sequence may be allocated to R0, R0' and R1 by $c_{init}$ of Equation 3, however, different reference signal sequences may be allocated to R2 and R3 by An which is specially configured by the UE2 510 and the UE3 515. This is represented by the following mathematical expression.

$$c_{init} = (\lfloor n_s/2 \rfloor + 1) \cdot (2N_{ID}^{cell} + 1) \cdot 2^{16} + n'_{SCID} \quad \text{[Equation 4]}$$

$$n'_{SCID} = \begin{cases} 0 & \text{if } n_{SCID} = 0 \\ An & \text{else} \end{cases}$$

or $$n'_{SCID} = \begin{cases} 1 & \text{if } n_{SCID} = 1 \\ An & \text{else} \end{cases}$$

Referring to Equation 4, $c_{init}$ is dependently determined by $n'_{SCID}$. $n'_{SCID}$ is 0 when the case that $n_{SCID}$ which is the value of Scrambling Code Identity (SCID) is 0. And $n'_{SCID}$ is An when $n_{SCID}$ is not 0, that is, $n_{SCID}$ is 1. Or, on the contrary, in the case that $n_{SCID}$ which is the value of Scrambling Code Identity (SCID) is 1, $n'_{SCID}$ is 1, and if $n_{SCID}$ is not 1, that is, in case of 0, $n'_{SCID}$ may become An. n of the An may represent UE of $n^{th}$ order, and may be the identifier of the UE. And An is the parameter which is used for generating the reference signal sequence for the UE by the transmission and reception point, and is the UE-specific value which is distinctly determined for each UE. Accordingly, An may be different if the UE is different, but even in case that An is identical, since An is dedicatedly determined for each UE, the value An may be a UE-specific value. An may be the information that the transmission and reception point notifies to the UE, or the information that is already recognized between the transmission and reception point and the UE.

In the embodiment above, since the value of $n'_{SCID}$ is dependently determined by the value of $n_{SCID}$, the transmission and reception point may establish the value of $n_{SCID}$. Although $n'_{SCID}$ is the parameter which means the SCID applied to an embodiment of the present invention, it is not limited to such term within the scope of the same meaning and usage, rather it may be denoted by different terms or ways. For example, the parameter $n_{SCID}$ used in Equation 2 and Equation 3 may be used as it is. That is, it may be that $n'_{SCID}=n_{SCID}$, in this case, $n_{SCID}$ (=$n'_{SCID}$) may have 0 or An. Or, $n_{SCID}$ (=$n'_{SCID}$) may have 1 or An, on the contrary.

As an example, $n_{SCID}$ is indicated by the scrambling identifier field of the DCI format 2B. The DCI format 2B is the downlink control information (DCI) that supports the antenna port 7 and/or 8, the scrambling identifier field has the value of 0 or 1 as 1 bit. If the scrambling identifier field is 0, it may be that $n_{SCID}=0$, and if the scrambling identifier field is 1, it may be that $n_{SCID}=1$. When applying it into Equation 4, $n'_{SCID}=0$ if $n_{SCID}=0$, and $n'_{SCID}=$An if $n_{SCID}=1$. Or it may be that $n'_{SCID}=1$ if $n_{SCID}=1$, and $n'_{SCID}=$An if $n_{SCID}=0$, on the contrary.

As another example, $n_{SCID}$ is indicated by the Antenna port of the DCI format 2C, the Scrambling identifier and the Number of layers (ASN) field. Accordingly, the ASN field may include the scrambling identifier field in the DCI format 2B. The DCI format 2C is the DCI supporting the antenna ports 7, 8, 9, 10, 11, 12, 13 and/or 14. And the ASN field has one value of 0 to 7 as 3 bits. The contents indicated by the ASN field are as following table.

TABLE 2

| | Codeword 1 ea (Codeword 0: activation, Codeword 1: non activation) | | Codeword 2 ea (Codeword 0: activation, Codeword 1: activation) |
|---|---|---|---|
| value | message | value | message |
| 0 | 1 layer, port 7, $n_{SCID}$ = 0 | 0 | 2 layers, port 7-8, $n_{SCID}$ = 0 |
| 1 | 1 layer, port 7, $n_{SCID}$ = 1 | 1 | 2 layers, port 7-8, $n_{SCID}$ = 1 |
| 2 | 1 layer, port 8, $n_{SCID}$ = 0 | 2 | 3 layers, port 7-9 |
| 3 | 1 layer, port 8, $n_{SCID}$ = 1 | 3 | 4 layers, port 7-10 |
| 4 | 2 layers, port 7-8 | 4 | 5 layers, port 7-11 |
| 5 | 3 layers, port 7-9 | 5 | 6 layers, port 7-12 |
| 6 | 4 layers, port 7-10 | 6 | 7 layers, port 7-13 |
| 7 | Reserved | 7 | 8 layers, port 7-14 |

Referring to Table 2, in an environment in which only one codeword is activated, if the value of the ASN field is 1, the number of layer is 1 and the antenna port 7 is used, and $n_{SCID}$=1. Or, in an environment in which all of the two codewords are activated, if the value of the ASN field is 6, the number of layer is 7 and the antenna ports 7 to 13 are used, and $n_{SCID}$=0. In the DCI format 2C, $n_{SCID}$ is 0 or 1 for the antenna port 7 and/or 8, and it is always 0 for remainder antenna ports.

First of all, considering the case that the number of codeword is 1, if the value of the ASN field is 0, 2, 4, 5 and 6, $n_{SCID}$=0 and consequently, it may be that n'$_{SCID}$=0 according to Table 2 and Equation 4. And if the value of the ASN field is 1 and 3, $n_{SCID}$=1 and consequently, it may be that $n_{SCID}$=An. Next, considering the case that the number of codeword is 2, if the value of the ASN field is 0, 2, 3, 4, 5, 6 and 7, $n_{SCID}$=0, and it may be that n'$_{SCID}$=0 according to Table 2 and Equation 4. And if value of the ASN field is 1, since $n_{SCID}$=1, it may be that $n_{SCID}$=An. Or, on the contrary, as described above, in the above case, n'$_{SCID}$=1 if $n_{SCID}$=1, and n'$_{SCID}$=An if $n_{SCID}$=0.

In Equation 4, the value of n'$_{SCID}$ is defined to be determined depending on the value of $n_{SCID}$. However, n'$_{SCID}$ may be independently defined with $n_{SCID}$ according to Equation 5.

$$c_{init}=(\lfloor n_s/2 \rfloor+1)\cdot(2N_{ID}^{cell}+1)\cdot 2^{16}+n_{SCID}$$

$$n'_{SCID}=B_n \quad \text{[Equation 5]}$$

Referring to Equation 5, n'$_{SCID}$ is the same as Bn. Here, Bn is a parameter which is used for generating the reference signal sequence for the UE by the transmission and reception point and it is the UE-specific value which is uniquely determined for each UE. Accordingly, Bn may be different if the UE is different, but even in case that Bn is identical, the value of Bn may be seen as the UE-specific value since Bn is dedicatedly determined. Bn may be the information that is notified by the transmission and reception point to UE in advance, or the information that is already recognized between the transmission and reception point and the UE.

Although the new parameter n'$_{SCID}$ is defined in Equation 4 and Equation 5, $n_{SCID}$ of Equation 3 may be utilized as it is if the DCI format which newly definable is used. For example, the reference signal sequence may be generated by the DCI format 2D which is newly defined for the CoMP or by the transmission mode 10 corresponding to this. In this time, $n_{SCID}$ may be indicated by the ASN field in the DCI format 2D as following table.

TABLE 3

| | Codeword 1 ea (Codeword 0: activation, Codeword 1: non activation) | | Codeword 2 ea (Codeword 0: activation, Codeword 1: activation) |
|---|---|---|---|
| value | message | value | message |
| 0 | 1 layer, port 7, $n_{SCID}$ = 0 | 0 | 2 layers, port 7-8, $n_{SCID}$ = 0 |
| 1 | 1 layer, port 7, $n_{SCID}$ = An | 1 | 2 layers, port 7-8, $n_{SCID}$ = An |
| 2 | 1 layer, port 8, $n_{SCID}$ = 0 | 2 | 3 layers, port 7-9 |
| 3 | 1 layer, port 8, $n_{SCID}$ = An | 3 | 4 layers, port 7-10 |
| 4 | 2 layers, port 7-8 | 4 | 5 layers, port 7-11 |
| 5 | 3 layers, port 7-9 | 5 | 6 layers, port 7-12 |
| 6 | 4 layers, port 7-10 | 6 | 7 layers, port 7-13 |
| 7 | Reserved | 7 | 8 layers, port 7-14 |

Referring to Table 3, first, considering the case that the number of codeword is 1 ea, if the value of the ASN field is 0, 2, 4, 5 and 6, n $n_{SCID}$=0 according to Table 3 and Equation 3. And if value of the ASN field is 1 and 3, it may be that n $n_{SCID}$=An. Next, considering the case that the number of codeword is 2 ea, if the value of the ASN field is 0, 2, 3, 4, 5, 6 and 7, n $n_{SCID}$=0 according to Table 3 and Equation 3. And if the value of the ASN field is 1, it may be that n $n_{SCID}$=An.

Or, on the contrary, Table 3 may be represented as Table 4.

TABLE 4

| | Codeword 1 ea (Codeword 0: activation, Codeword 1: non activation) | | Codeword 2 ea (Codeword 0: activation, Codeword 1: activation) |
|---|---|---|---|
| value | message | value | message |
| 0 | 1 layer, port 7, $n_{SCID}$ = An | 0 | 2 layers, port 7-8, $n_{SCID}$ = An |
| 1 | 1 layer, port 7, $n_{SCID}$ = 1 | 1 | 2 layers, port 7-8, $n_{SCID}$ = 1 |
| 2 | 1 layer, port 8, $n_{SCID}$ = An | 2 | 3 layers, port 7-9 |
| 3 | 1 layer, port 8, $n_{SCID}$ = 1 | 3 | 4 layers, port 7-10 |
| 4 | 2 layers, port 7-8 | 4 | 5 layers, port 7-11 |
| 5 | 3 layers, port 7-9 | 5 | 6 layers, port 7-12 |
| 6 | 4 layers, port 7-10 | 6 | 7 layers, port 7-13 |
| 7 | Reserved | 7 | 8 layers, port 7-14 |

Referring to Table 4, considering the case that the number of codeword is 1 ea, if the value of the ASN field is 0, 2, 4, 5 and 6, n $n_{SCID}$=An according to Table 4 and Equation 3. And if value of the ASN field is 1 and 3, it may be that n $n_{SCID}$=1. Also, considering the case of the number of codeword is 2, if the value of the ASN field is 0, 2, 3, 4, 5, 6 and 7, $n_{SCID}$=An according to Table 4 and Equation 3, and if value of the ASN field is 1, it may be that n $n_{SCID}$=1.

According to this, the DCI format 2B and the ASN field within 2C indicate the contents as shown in Table 2, however the ASN field within the DCI of new form such as the DCI format 2D indicates the contents as shown in Tables 3 and 4.

As still another example, what the values of each ASN field in Table 2 as shown in Table 5 below represent is mostly maintained as it is, the case $n_{SCID}$=An may be represented only for the case that the number of codeword is 1 ea and the value of the ASN field is 7, which is not used but reserved.

TABLE 5

| Codeword 1 ea (Codeword 0: activation, Codeword 1: non activation) | | Codeword 2 ea (Codeword 0: activation, Codeword 1: activation) | |
|---|---|---|---|
| value | message | value | message |
| 0 | 1 layer, port 7, $n_{SCID} = 0$ | 0 | 2 layers, port 7-8, $n_{SCID} = 0$ |
| 1 | 1 layer, port 7, $n_{SCID} = 1$ | 1 | 2 layers, port 7-8, $n_{SCID} = 1$ |
| 2 | 1 layer, port 8, $n_{SCID} = 0$ | 2 | 3 layers, port 7-9 |
| 3 | 1 layer, port 8, $n_{SCID} = 1$ | 3 | 4 layers, port 7-10 |
| 4 | 2 layers, port 7-8 | 4 | 5 layers, port 7-11 |
| 5 | 3 layers, port 7-9 | 5 | 6 layers, port 7-12 |
| 6 | 4 layers, port 7-10 | 6 | 7 layers, port 7-13 |
| 7 | 1 layer, port 7, $n_{SCID} = An$ | 7 | 8 layers, port 7-14 |

Referring to Table 5, the case n $n_{SCID}=An$ corresponds only to the case that one layer is used and the number of the antenna port for that is 7 ea. Also, in case that the number of codeword is 1 ea and the value of the ASN field is 4, 5 and 6, n $n_{SCID}=0$. And in case that the number of codeword is 2 ea and the value of the ASN field is 2, 3, 4, 5, 6 and 7, $n_{SCID}=0$, too.

As still another example, what the values of each ASN field in Table 2 as shown in Table 6 below represent is mostly maintained as it is, meanwhile the case n $n_{SCID}=An$ may be represented through 2 ea of random ASN field for the case that the number of codeword is 1 ea and the value of the ASN field is 4, 5 and 6, which is used for retransmission and for the case that the number of codeword is 1 ea and the value of the ASN field is 7, which is not used but reserved.

TABLE 6

| Codeword 1 ea (Codeword 0: activation, Codeword 1: non activation) | | Codeword 2 ea (Codeword 0: activation, Codeword 1: activation) | |
|---|---|---|---|
| value | message | value | message |
| 0 | 1 layer, port 7, $n_{SCID} = 0$ | 0 | 2 layers, port 7-8, $n_{SCID} = 0$ |
| 1 | 1 layer, port 7, $n_{SCID} = 1$ | 1 | 2 layers, port 7-8, $n_{SCID} =1$ |
| 2 | 1 layer, port 8, $n_{SCID} = 0$ | 2 | 3 layers, port 7-9 |
| 3 | 1 layer, port 8, $n_{SCID} = 1$ | 3 | 4 layers, port 7-10 |
| 4 | 2 layers, port 7-8 or 1 layer, port 7, $n_{SCID} = An$ | 4 | 5 layers, port 7-11 |
| 5 | 3 layers, port 7-9 or 1 layer, port 8, $n_{SCID} = An$ | 5 | 6 layers, port 7-12 |
| 6 | 4 layers, port 7-10 | 6 | 7 layers, port 7-13 |
| 7 | Reserved | 7 | 8 layers, port 7-14 |

Referring to Table 6, regarding case that the number of codeword is 1 ea and the value of the ASN field is 4 and 5, it corresponds to the case that one layer is used for the case n $n_{SCID}=An$, and the antenna port number for that is 7 or 8. Also, since he case that the number of codeword is 1 ea and the value of the ASN field is 4, 5 and 6 is originally used for the Re-transmission, the case n $n_{SCID}=An$ may be used if the re-transmission is not indicated. For example, in case that the number of codeword is 1 ea and the value of the ASN field is 4 in Table 6, one layer and antenna port 7 are used and the case $n_{SCID}=An$ is indicated if it is not re-transmission, two layers and antenna ports 7 and 8 are used and the case $n_{SCID}=0$ is indicated if it is re-transmission.

To summarize again, the reference signal sequence may be generated by $n'_{SCID}$ which is determined by the combination of Table 2 and Equation 4, or generated by n $n_{SCID}$ which is determined by the combination of one of Table 3, Table 4, Table 5 or Table 6 and Equation 3.

In this case, the value of scrambling code identifier which is used for generating the reference signal sequence may be configured from the UE-specific value or the cell-specific value.

Here, the UE-specific value may be An or Bn as mentioned above, and the cell-specific value may be 0 or 1 as the existing value of $n_{SCID}$.

In this time, in case of generating the reference signal sequence which is transmitted from a specific transmission and reception point to a specific UE differently from the reference signal sequence which is transmitted from another transmission and reception point to another UE (This may correspond to the case of guaranteeing pseudo orthogonality among the reference signal sequences.), the value of scrambling code identifier may be set up from the UE-specific value transmitted above.

Also, in case of generating the reference signal sequence which is transmitted from a specific transmission and reception point to a specific UE identically to the reference signal sequence which is transmitted from another transmission and reception point to the specific UE or the reference signal sequence transmitted from the specific transmission and reception point to another UE (This may correspond to the case of the JT or the MU-MIMO.), the value of scrambling code identifier may be set up from the cell-specific value transmitted above.

Hereinafter, An or Bn which is the UE-specific value used for generating the reference signal sequence will be described in more detail.

As an example, the UE-specific value may include the Radio Network Temporary Identifier (RNTI) of 16 bits. Since the RNTI value is differently set up for each UE, the UE-specific value may be classified as such. The transmission and reception point may calculate $c_{init}$ according to Equation 3 to 5 taken An or Bn as the RNTI value, generate the reference signal sequence by Equation 2 using the $c_{init}$ calculated, perform mapping the reference signal sequence generated to the resource element and transmit the reference signal after generating it to each UE. Since the RNTI is the information that each UE already knows, it is not necessary for the transmission and reception point to perform signaling the UE-specific value to the UE separately, it is beneficial in the aspect of overhead.

As another example, the UE-specific value may be transmitted through the higher layer signaling which is specific to the UE. The UE-specific value may be transmitted through the higher layer signaling which is specific to the UE, for example, by the RRC signaling. Here, the number of bit allocated in order to indicate the UE-specific value is M ea and different UE-specific values may be allocated to maximum 2M ea of UEs. By this, the transmission and reception point may transmit the reference signal depending on the different reference signal sequences to maximum 2M ea of UEs. Accordingly, there is pseudo orthogonality among the reference signal sequences of the maximum 2M ea of UEs.

As another example, the UE-specific value may be transmitted by the higher layer signaling which is specific to the transmission and reception point. For example, the UE-specific value may be transmitted through the higher layer signaling which is specific to the transmission and reception point, for example, by the RRC signaling. The number of bit is allocated in order to indicate the UE-specific value is M ea and different UE-specific values may be set up among the maximum $2^M$ of transmission and reception points. By this, the maximum $2^M$ number of transmission and reception points may transmit the reference signal depending on the different reference signal sequences to the UE. Accordingly, there is pseudo orthogonality among the reference signal sequences of the maximum $2^M$ of transmission and reception points.

As another example, the UE-specific value may be transmitted in connection with the CSI-RS antenna port information and/or the CSI-RS configuration. For example, the UE-specific value may be transmitted in connection with the CSI-RS antenna port information and/or the CSI-RS configuration, which may be signaling specifically to the transmission and reception point.

For example, the CSI-RS antenna port information which has the value of 15 to 22 may correspond to the UE-specific value, An or Bn as shown in Equation 6.

$$An \text{ or } Bn = (\text{CSI-RS antenna port number}) - 15 \qquad [\text{Equation 6}]$$

Or, for example, the CSI-RS configuration with the value of 0 to 31 may correspond to the UE-specific value, An or Bn as shown in Equation 7.

$$An \text{ or } Bn = (\text{CSI-RS configuration number}) \qquad [\text{Equation 7}]$$

The transmission and reception point may generate the reference signal sequence based on Equation 6 or Equation 7, perform mapping it to the resource element and transmit the reference signal after generating it to each UE. In this time, since the CSI-RS antenna port information and/or the CSI-RS configuration are/is recognized by each UE through another signaling for the CSI-RS, consequently, the bit which is signaled for An or Bn may be 0 bit.

Figure 6:
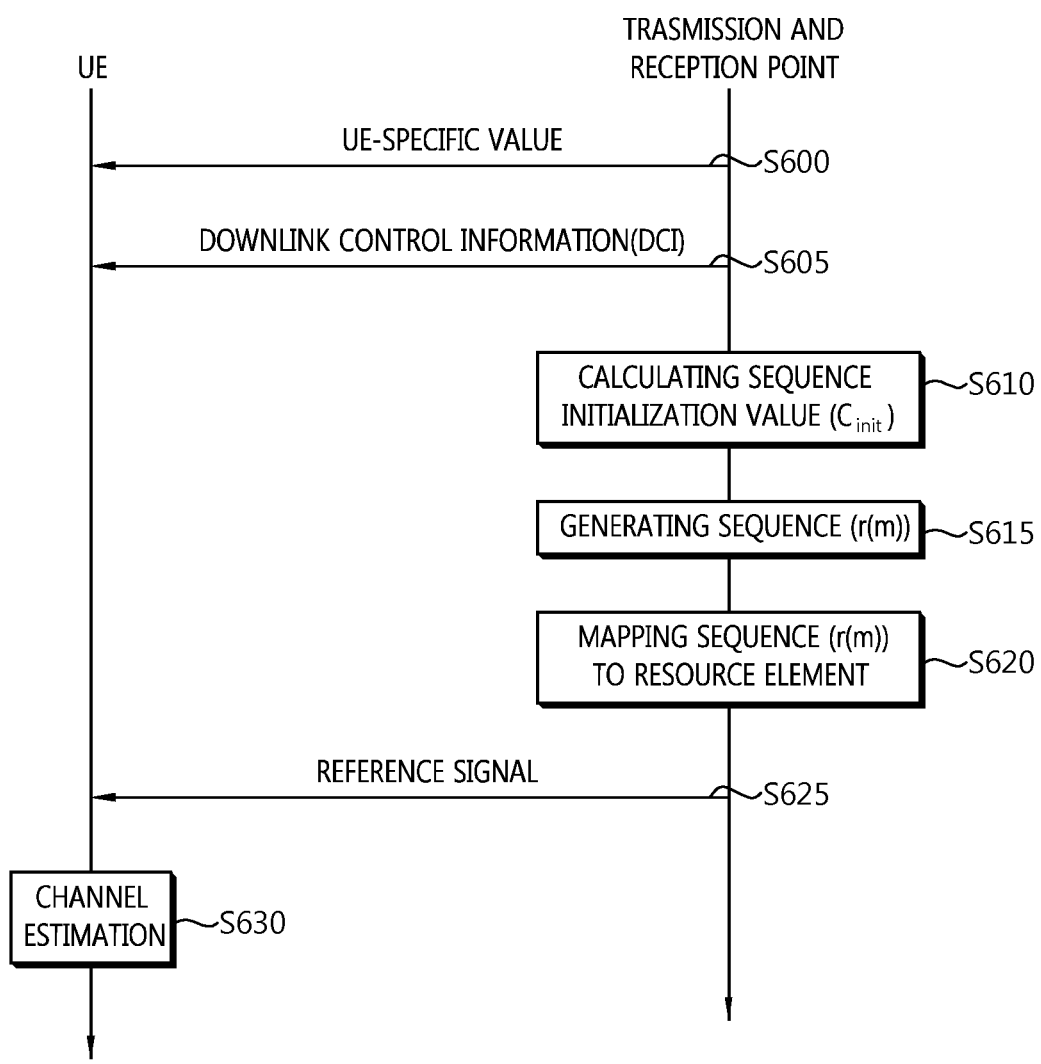
FIG. 6 is a flowchart describing the method of transmitting reference signal according to an embodiment of the present invention.

FIG. 6 is a flowchart describing the method of transmitting reference signal according to an embodiment of the present invention.

Referring to FIG. 6, a transmission and reception point transmits a UE-specific value to a UE (step, S600). The UE-specific value is An or Bn described above, may be the RNTI or the value given by a UE-specific RRC signaling, or the value given by the RRC signaling which is specific to the transmission and reception point, or the value given by signaling in connection with CSI-RS antenna port information and/or the CSI-RS configuration.

The transmission and reception point may transmit the downlink control information (DCI) to the UE (step, S605). The downlink control information is the DCI format 2B, and may include the scrambling identifier field. Or, the downlink control information is the DCI format 2C, and may include the ASN field. Or, the downlink control information is the newly definable DCI such as DCI format 2D, and may include the scrambling identifier field inducing $n_{SCID}$ or $n'_{SCID}$, or may include the ASN field.

The transmission and reception point calculates $c_{init}$, which is an initialization value of a PN sequence based on a scrambling identifier field or an ASN field and the UE-specific value (step, S610). For example, a mathematical formula for calculating $c_{init}$ may be one of Equation 3 to Equation 5.

The transmission and reception point may generate a reference signal sequence r(m) by applying $c_{init}$ obtained above into Equation 2 (step, S615).

The transmission and reception point may perform mapping the reference signal sequence r(m) to a resource element (step, S620), and may transmit the reference signal to the UE through the resource element (step, S625). In this time, an antenna port to which the reference signal is transmitted may be determined either to antenna port 7 or 8 by the scrambling identifier field, or may be determined from one of Table 2 to Table 6 by the ASN field.

The UE may estimate a downlink channel based on the reference signal received (step, S630).

Figure 7:
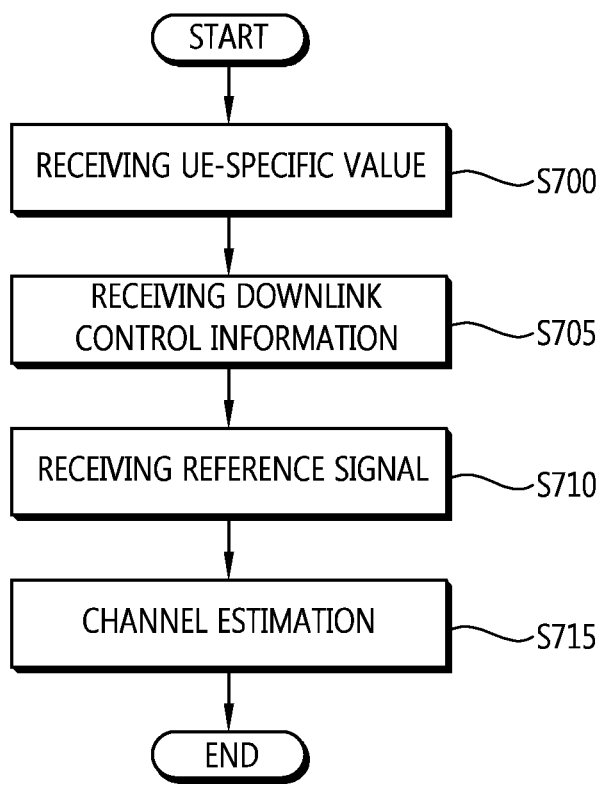
FIG. 7 is a flowchart describing the method of receiving the reference signal of the UE according to an embodiment of the present invention.

FIG. 7 is a flowchart describing the method of receiving the reference signal of the UE according to an embodiment of the present invention.

Referring to FIG. 7, a UE may receive a UE-specific value from a transmission and reception point (S700). The UE-specific value is An or Bn described above, may be the RNTI or the value given by a UE-specific RRC signaling, or the value given by the RRC signaling which is specific to the transmission and reception point, or the value given by signaling in connection with CSI-RS antenna port information and/or the CSI-RS configuration.

The UE may receive downlink control information (DCI) from the transmission and reception point (step, S705). The downlink control information is the DCI format 2B, and may include a scrambling identifier field. Or, the downlink control information is the DCI format 2C, and may include an ASN field. Or, the downlink control information is a newly definable DCI such as DCI format 2D, and may include a scrambling identifier field inducing $n_{SCID}$ or $n'_{SCID}$, or may include the ASN field.

The UE may receive a reference signal generated by a reference signal sequence according to the UE-specific value from the transmission and reception point (step, S710). The UE may estimate the downlink channel based on the reference signal received.

Figure 8:
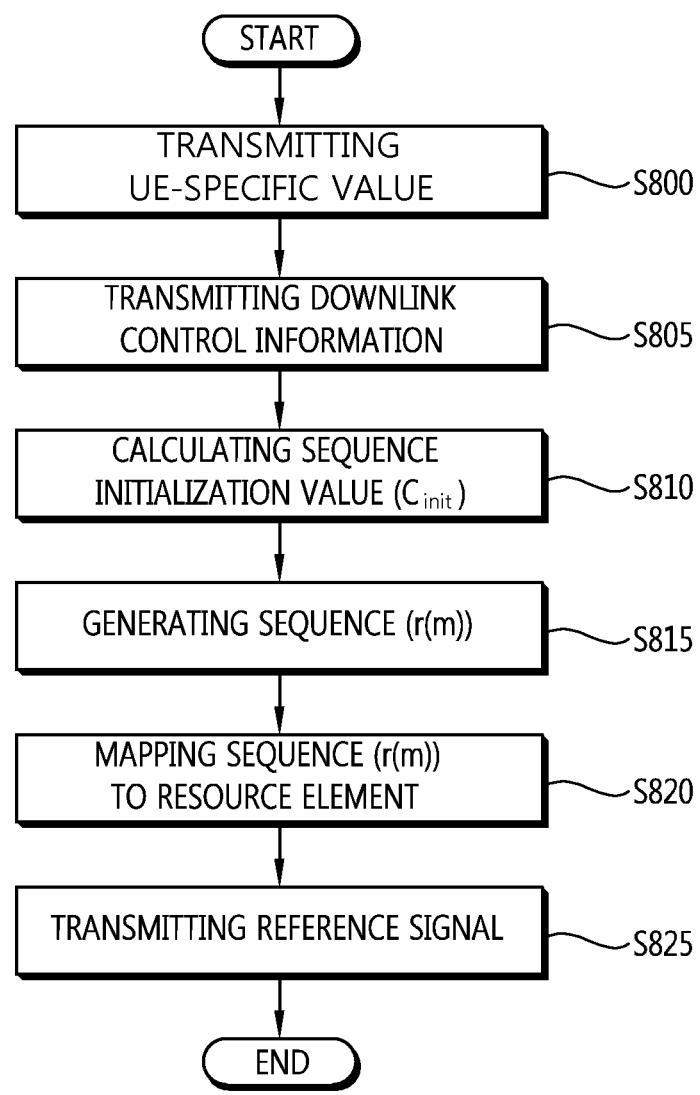
FIG. 8 is a flowchart describing the method of receiving reference signal of the transmission and reception point according to an embodiment of the present invention.

FIG. 8 is a flowchart describing the method of receiving reference signal of the transmission and reception point according to an embodiment of the present invention.

Referring to FIG. 8, a transmission and reception point may transmit a UE-specific value to a UE (step, S800). The UE-specific value is An or Bn described above, may be the RNTI or the value given by a UE-specific RRC signaling, or the value given by the RRC signaling which is specific to the transmission and reception point, or the value given by signaling in connection with CSI-RS antenna port information and/or the CSI-RS configuration.

The transmission and reception point may transmit downlink control information (DCI) to the UE (step, S805). The downlink control information is the DCI format 2B, and may include a scrambling identifier field. Or, the downlink control information is the DCI format 2C, and may include an ASN field. Or, the downlink control information is a newly definable DCI such as DCI format 2D, and may include a scrambling identifier field inducing $n_{SCID}$ or $n'_{SCID}$, or may include the ASN field.

The transmission and reception point calculates $c_{init}$, which is an initialization value of a PN sequence based on the scrambling identifier field or the ASN field and the UE-specific value (step, S810). For example, the mathematical formula for calculating $c_{init}$ may be one of Equation 3 to Equation 5.

The transmission and reception point may generate a reference signal sequence r(m) by applying $c_{init}$ calculated above into Equation 2 (step, S815).

The transmission and reception point may perform mapping the reference signal sequence r(m) to a resource element (step, S820), and may transmit the reference signal to the UE by the resource element (step, S825). In this time, a antenna port to which the reference signal is transmitted may be determined to the antenna port 7 or 8 by the scrambling identifier field, or may be determined from one of Table 2 to Table 5 by the ASN field.

Figure 9:
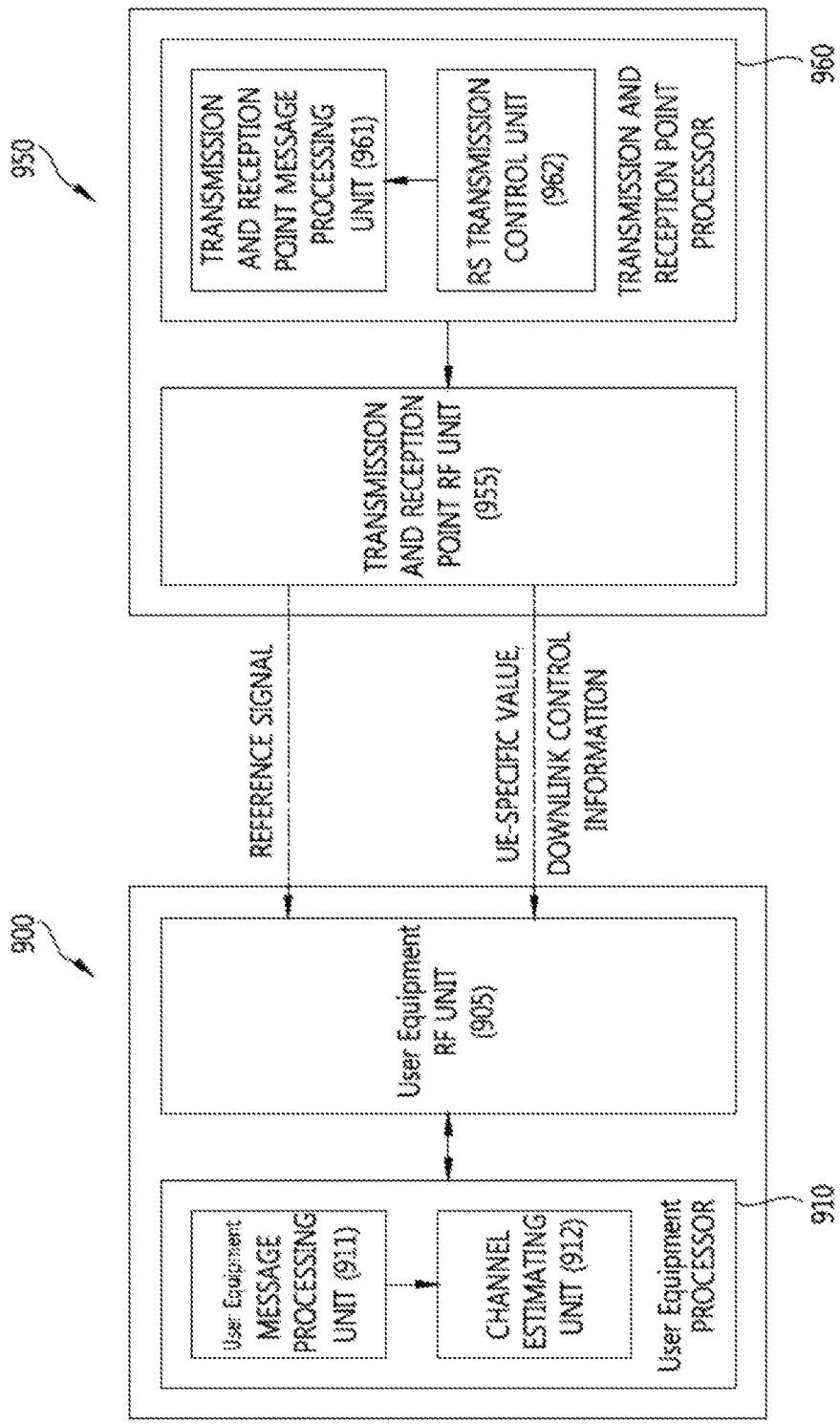
FIG. 9 is a block diagram illustrating the UE and the transmission and reception point according to an embodiment of the present invention.

FIG. 9 is a block diagram illustrating the UE and the transmission and reception point according to an embodiment of the present invention.

Referring to FIG. 9, a UE 900 may include a UE RF unit 905 and a UE processor 910. The UE processor 910 may include a UE massage processing unit 911 and a channel estimating unit 912.

The UE RF unit 905 may receive the information of a UE-specific value, which is the parameter used for generating the reference signal sequence which is specific to the UE 900, the downlink control information and the reference signal, from the transmission and reception point 950. The transmission and reception point 950 may be either one of the macro cell or the RRH. The transmission and reception point 950 may be the object which is communicating with the UE 900 forming cooperating set with other transmission and reception point (not shown in drawings).

The UE massage processing unit 911 analyzes the scrambling identifier field or the ASN field of the downlink control information according to predefined method.

The channel estimating unit 912 calculates $c_{init}$ based on $n'_{SCID}$, the selected value one of the UE-specific value and the cell-specific value, and may induce the reference signal sequence according to Equation 2. For example, the channel estimating unit 912 determines $n'_{SCID}$ as the UE-specific value based on Equation 4 or Equation 5, and calculates $c_{init}$ based on $n'_{SCID}$ determined according to Equation 4 and Equation 5, and induces the reference signal sequence according to Equation 2. Or, the channel estimating unit 912 identifies $n_{SCID}$ from the bit value of the ASN field based on one of Table 3 to Table 6, and calculates $c_{init}$ according to Equation 3, and induces the reference signal sequence by applying it into Equation 2.

The channel estimating unit 912 identifies the reference signal which is specific to the UE 900 using the reference signal sequence induced above, and performs the downlink channel estimation based on the reference signal which is specific to the UE 900.

The transmission and reception point 950 includes a transmission and reception point RF unit 955 and a transmission and reception point processor 960. The transmission and reception point processor 960 includes a transmission and reception point massage processing unit 961 and a RS transmission control unit 962.

The transmission and reception point RF unit 955 transmits the information of the UE-specific value and the downlink control information to the UE 900. The UE-specific value is An or Bn, may be the RNTI or the value provided by the UE-specific RRC signaling, or the value provided by the RRC signaling which is specific to the transmission and reception point, or the value provided by signaling in connection with the CSI-RS antenna port information and/or the CSI-RS configuration.

The transmission and reception point massage processing unit 961 generates the information of the UE-specific value and the downlink control information. And the transmission and reception point massage processing unit 961 generates the scrambling identifier field or the ASN field of the downlink control information according to the predefined method.

The RS transmission control unit 962 selects or determines one of the value from the UE-specific value A and the cell-specific value (0 or 1), which is the parameter used for generating the UE-specific reference signal sequence. Here, the value selected may be $n'_{SCID}$ from Equation 4 or Equation 5 and Table 2. And the transmission and reception point massage processing unit 961 generates the downlink control information including the scrambling code identifier field indicating that the initialization value of the reference signal sequence is determined by the value selected by the RS transmission control unit 962. Or, the scrambling code identifier field may be defined for indicating one of the UE-specific value and the cell-specific value.

Meanwhile, the RS transmission control unit 962 determines $n'_{SCID}$ to the UE-specific value based on the value selected above, according to Equation 4, for example, and obtains $c_{init}$, and generates the reference signal sequence according to Equation 2. Or, the RS transmission control unit 962 determines $n'_{SCID}$ as the UE-specific value based on Equation 5, and obtains $c_{init}$ based on $n'_{SCID}$ determined according to and Equation 5, and generates the reference signal sequence according to Equation 2. Or, the RS transmission control unit 962 identifies $n_{SCID}$ using the bit value of the ASN field of one of Table 3 to Table 6, and obtains $c_{init}$ according to Equation 3, and induces the reference signal sequence by applying it into Equation 2.

The transmission and reception point RF unit 955 performs mapping the reference signal sequence acquired from the RS transmission control unit 962 to resource element, and transmits the reference signal to the UE 900 through the resource element which is mapped. In this time, the antenna port to which the reference signal is transmitted may be determined to the antenna port 7 or 8 by the scrambling identifier field, or may be determined from one of Table 2 to Table 6 by the ASN field.

What has been described above is merely exemplary description of the technical subject matter of the present invention, and it should be understood by those ordinary skilled in the art, however, that the present invention can be modified or changed in various ways without departing from the essential features of the present invention. Accordingly, the embodiments disclosed in the present invention is not to limit the scope of the technical subject matter, but to describe it, thus the scope of the technical subject matter of the present invention is not limited by the embodiment. The scope of the present invention should be interpreted by the claims below, and should be understood that all of the technical subject matter including the equivalence should be fall into the scope of the present invention.

What is claimed is:

1. A method for transmitting a reference signal by a transmission and reception point in a wireless communication system, the method comprising:
    transmitting at least one user equipment (UE)-specific value which is a parameter used for generating a UE-specific reference signal sequence to the UE, wherein the at least one UE-specific value is selected from a range of values including more than 2 values;
    generating downlink control information (DCI) format 2D, wherein the DCI includes an Antenna port, Scrambling identifier and Number of layers (ASN) field, wherein the ASN field is set to a value of 0 to 7 inclusive, wherein ASN field values 0, 2, 4, 5, and 6 when one codeword is enabled, and ASN field values of 0, 2, 3, 4, 5, 6, and 7 when two codewords are enabled, indicate a particular one UE-specific value of the at least one UE-specific value, wherein other values of the ASN field do not correspond to using the particular one UE-specific value;
    transmitting the DCI;
    calculating an initialization value of pseudo-noise (PN) sequence based on the particular one UE-specific value;
    generating a reference signal sequence using the initialization value of PN sequence;
    mapping the reference signal sequence to a resource element; and
    transmitting a reference signal to the UE using the resource element to which the reference signal sequence is mapped.

2. The method of claim 1, wherein transmitting the DCI comprises transmitting a physical downlink control channel (PDCCH) which includes the DCI to the UE.

3. The method of claim 2, wherein the value of the scrambling identifier is either 0 or 1.

4. The method of claim 1, wherein the at least one UE-specific value is transmitted to the UE by a UE-specific radio resource control (RRC) signaling.

5. A method for receiving a reference signal by a user equipment (UE) in a wireless communication system, the method comprising:
- receiving at least one UE-specific value which is a parameter used for generating a UE-specific reference signal sequence of the UE from a transmission and reception point, wherein the at least one UE-specific value is selected from a range of values including more than 2 values;
- receiving a downlink control information (DCI) format 2D, wherein the DCI includes an Antenna port, Scrambling identifier and Number of layers (ASN) field, wherein ASN field values 0, 2, 4, 5, and 6 when one codeword is enabled, and ASN field values of 0, 2, 3, 4, 5, 6, and 7 when two codewords are enabled, indicate a particular one UE-specific value of the at least one UE-specific value, wherein other values of the ASN field do not correspond to using the particular one UE-specific value;
- calculating an initialization value of pseudo-noise (PN) sequence based on the particular one UE-specific value of the at least one UE-specific value;
- calculating a reference signal sequence using the initialization value of PN sequence;
- receiving the reference signal from the transmission and reception point; and
- estimating a downlink channel by comparing the reference signal sequence obtained from the reference signal received with the reference signal sequence calculated.

6. The method of claim 5,
wherein said receiving a DCI includes receiving the DCI on a physical downlink control channel (PDCCH).

7. The method of claim 6, wherein the value of the scrambling identifier is either 0 or 1.

8. The method of claim 5, wherein the at least one the UE-specific value is received by a radio resource control (RRC) signaling which is specific to the UE.

9. A transmission and reception point transmitting a reference signal in a wireless communication system, the transmission and reception point comprising:
- a radio frequency (RF) transceiver; and
- a processor configured with processor-executable instructions to:
  - select one particular user equipment (UE)-specific value out of at least one UE-specific value, wherein the at least one UE-specific value is selected from a range of values including more than 2 values, which is a parameter used for generating a UE-specific reference signal sequence,
  - generate downlink control information (DCI) format 2D, wherein the DCI includes an Antenna port, Scrambling identifier and Number of layers (ASN) field, wherein the ASN field is set to a value of 0 to 7 inclusive, wherein ASN field values 0, 2, 4, 5, and 6 when one codeword is enabled, and ASN field values of 0, 2, 3, 4, 5, 6, and 7 when two codewords are enabled, indicate the particular UE-specific value of the at least one UE-specific value, wherein other values of the ASN field do not correspond to using the particular UE-specific value;
  - calculate an initialization value of pseudo-noise (PN) sequence based on the particular UE-specific value, and generate a reference signal sequence based on the initialization value of PN sequence;
  - map the reference signal sequence to a resource element;
  - transmit a reference signal through the resource element; and
  - transmit the particular UE-specific value to the UE.

10. The transmission and reception point of claim 9, wherein the transmission and reception point transceiver transmits a physical downlink control channel (PDCCH) which includes the DCI generated to the UE.

11. The transmission and reception point of claim 10, wherein the UE processor sets up the value of the scrambling identifier to be either 0 or 1.

12. The transmission and reception point of claim 9, wherein the transmission and reception point transceiver transmits the particular UE-specific value to the UE by a UE-specific radio resource control (RRC) signaling.

13. A user equipment (UE) receiving a reference signal in a wireless communication system, the UE comprising:
- a radio frequency (RF) transceiver which:
  - receives at least one UE-specific value which is a parameter used for generating a UE-specific reference signal sequence from a transmission and reception point, wherein the at least one UE-specific value is selected from a range of values including more than 2 values; and
  - receives a downlink control information (DCI) format 2D, wherein the DCI includes an Antenna port, Scrambling identifier and Number of layers (ASN) field, wherein the ASN field is set to a value of 0 to 7 inclusive, wherein ASN field values 0, 2, 4, 5, and 6 when one codeword is enabled, and ASN field values of 0, 2, 3, 4, 5, 6, and 7 when two codewords are enabled, indicate a particular one UE-specific value of the at least one UE-specific value, wherein other values of the ASN field do not correspond to using the particular one UE-specific value; and
- a processor which calculates an initialization value of pseudo-noise (PN) sequence based on the particular one UE-specific value, and induces a reference signal sequence based on the initialization value of PN sequence,
- wherein the RF transceiver receives a reference signal from the transmission and reception point, and
- wherein the processor identifies the reference signal using the reference signal sequence induced, and performs a downlink channel estimation based on the reference signal identified.

14. The user equipment (UE) of claim 13, wherein the DCI is received through a physical downlink control channel (PDCCH).

15. The user equipment (UE) of claim 14, wherein the value of the scrambling identifier is either 0 or 1.

16. The user equipment (UE) of claim 13, wherein the RF transceiver receives the at least one UE-specific value by a UE-specific radio resource control (RRC) signaling.

* * * * *